US012657305B2

(12) United States Patent
Cheng et al.

(10) Patent No.: US 12,657,305 B2
(45) Date of Patent: Jun. 16, 2026

(54) BIOS SETTINGS RUNTIME MODIFICATION AUTHENTICATION SYSTEM

(71) Applicant: Dell Products L.P., Round Rock, TX (US)

(72) Inventors: Po-Yu Cheng, Tainan City (TW); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 420 days.

(21) Appl. No.: 18/506,730

(22) Filed: Nov. 10, 2023

(65) Prior Publication Data

US 2025/0156547 A1 May 15, 2025

(51) Int. Cl.
G06F 21/57 (2013.01)
G06F 21/52 (2013.01)

(52) U.S. Cl.
CPC ............ G06F 21/572 (2013.01); G06F 21/52 (2013.01)

(58) Field of Classification Search
CPC ............................... G06F 21/57; G06F 21/572
See application file for complete search history.

(56) References Cited

U.S. PATENT DOCUMENTS 9,660,807 B2   5/2017  Lewis
9,875,113 B2   1/2018  Lin

2010/0241836 A1* 9/2010 Proudler ................. H04L 63/20
                                                        713/1
2013/0159690 A1* 6/2013 Tsukamoto ........... G06F 9/4401
                                                        713/2
2014/0095886 A1* 4/2014 Futral ..................... G06F 21/57
                                                        713/187
2014/0164781 A1* 6/2014 Joshi ..................... H04L 9/3271
                                                        713/184
2017/0168851 A1* 6/2017 Lin ......................... G06F 9/4406
2017/0244729 A1* 8/2017 Fahrny ............... H04L 63/0823
2022/0083666 A1* 3/2022 Laing .................... H04L 9/3247
2022/0391545 A1* 12/2022 Stewart ................. G06F 3/0623
2024/0394374 A1* 11/2024 Khoruzhenko ....... G06F 21/575

FOREIGN PATENT DOCUMENTS

CN          118862092 A  * 10/2024  ............. G06F 21/72

* cited by examiner

*Primary Examiner* — Jaweed A Abbaszadeh
*Assistant Examiner* — Cheri L Harrington
(74) *Attorney, Agent, or Firm* — Joseph Mencher

(57) ABSTRACT

A BIOS settings runtime modification authentication system includes a computing device having a user interface subsystem, a TPM device storing a platform owner authentication value, and a BIOS subsystem including BIOS settings. The BIOS subsystem generates a secret and creates challenge information with the TPM device using the secret. The challenge information is configured to allow the TPM device to retrieve the secret from the challenge information in response to the receiving the platform owner authentication value. During runtime operations for the computing device, the BIOS subsystem provides the challenge information via the user interface subsystem, receives a BIOS authentication request and the secret via the user interface subsystem and, in response, modifies at least one of the BIOS settings.

20 Claims, 11 Drawing Sheets

300

BIOS SUBSYSTEM GENERATES SECRET
302

BIOS SUBSYSTEM CREATES CHALLENGE INFORMATION WITH TPM DEVICE USING SECRET AND BIOS SETTINGS MODIFICATION AUTHENTICATION INFORMATION IN TPM DEVICE
304

TPM DEVICE RECEIVES AUTHENTICATION VALUE USED TO CREATE CHALLENGE INFORMATION?
306
N
Y

TPM DEVICE PROVIDES SECRET VIA USER INTERFACE SUBSYSTEM
308

BIOS SUBSYSTEM RECEIVES BIOS AUTHENTICATION REQUEST DURING RUNTIME OPERATIONS FOR COMPUTING DEVICE?
310
N
Y

BIOS SUBSYSTEM RECEIVES SECRET DURING RUNTIME OPERATIONS FOR COMPUTING DEVICE?
312
Y
N

BIOS SUBSYSTEM PREVENTS MODIFICATION OF BIOS SETTINGS
314

BIOS SUBSYSTEM ALLOWS MODIFICATION OF BIOS SETTINGS
316

202

COMPUTING DEVICE 200

USER INTERFACE SUBSYSTEM 208

BIOS ENGINE 204a

BIOS DATABASE 204b

BIOS SUBSYSTEM 204

TPM ENGINE 206a

TPM DATABASE 206b

TPM DEVICE 206

202

COMPUTING DEVICE 200

USER INTERFACE SUBSYSTEM 208

BIOS ENGINE 204a

BIOS DATABASE 204b

BIOS SUBSYSTEM 204

500

TPM ENGINE 206a

TPM DATABASE 206b

TPM DEVICE 206

202

COMPUTING DEVICE 200

USER INTERFACE SUBSYSTEM 208

BIOS ENGINE 204a

BIOS DATABASE 204b

BIOS SUBSYSTEM 204

TPM ENGINE 206a

TPM DATABASE 206b

TPM DEVICE 206

702

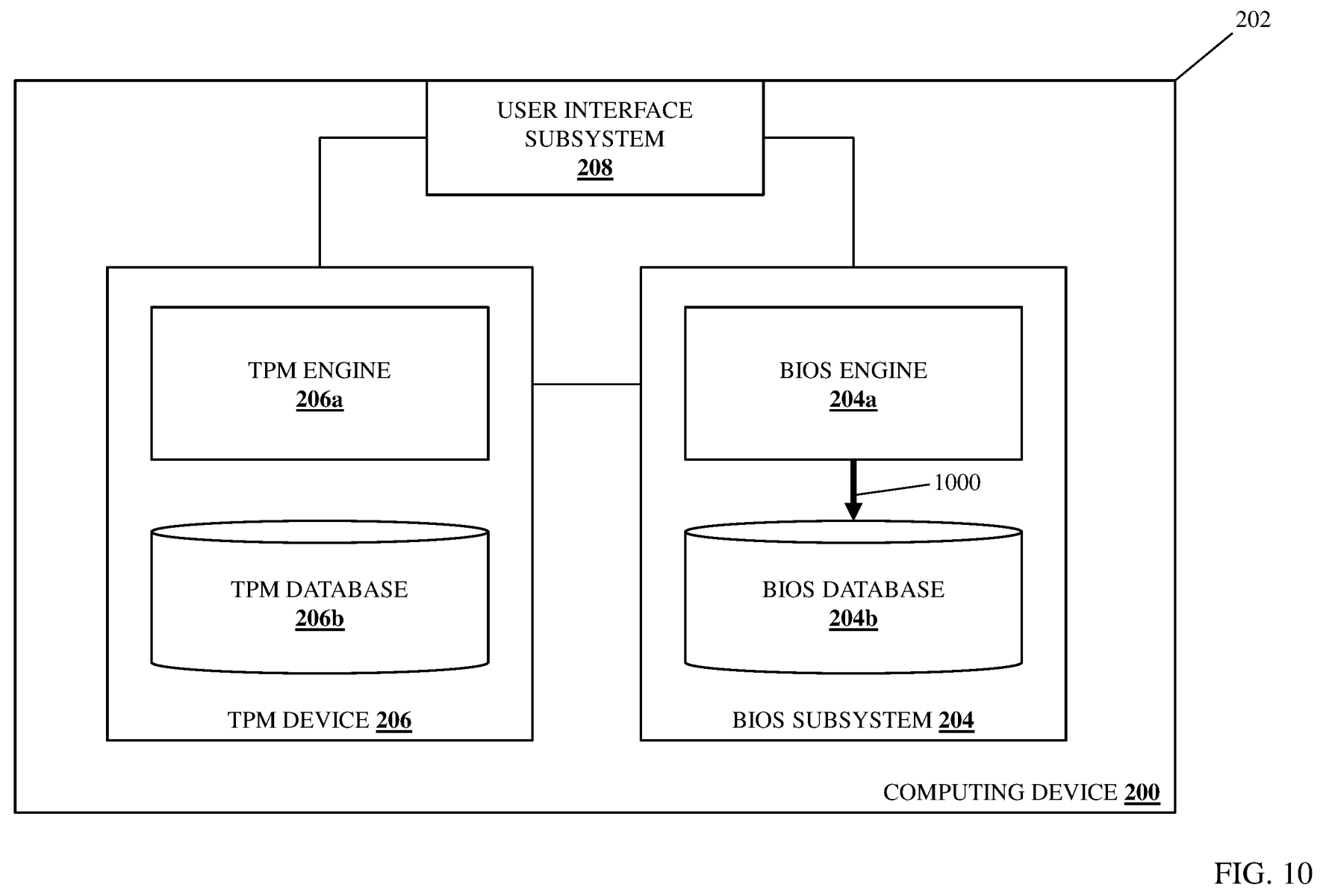

202

COMPUTING DEVICE 200

USER INTERFACE SUBSYSTEM 208

BIOS ENGINE 204a

1000

BIOS DATABASE 204b

BIOS SUBSYSTEM 204

TPM ENGINE 206a

TPM DATABASE 206b

TPM DEVICE 206

FIG. 10

BIOS SETTINGS RUNTIME MODIFICATION AUTHENTICATION SYSTEM

BACKGROUND

The present disclosure relates generally to information handling systems, and more particularly to authenticating modifications of Basic Input/Output System (BIOS) settings in an information handling system during runtime.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, and/or other computing devices known in the art, include a Basic Input/Output System (BIOS) that is configured to perform hardware initialization during an initialization process for the computing device, runtime services for an operating system and/or application/programs provided by the computing device, and/or other BIOS operations that would be apparent to one of skill in the art in possession of the present disclosure. Furthermore, the BIOS in a computing device may include a variety of BIOS settings that are configurable to define a "boot order", define a BIOS configuration, allow or disable BIOS operations, and/or provide other BIOS settings functionality known in the art, and unauthorized access to such BIOS settings in the BIOS can raise issues.

For example, in "as-a-Service" (aaS) environments and/or other situations in which computing devices are "rented" or otherwise provided/made available by a "platform owner" for use by clients, or in edge computing environments and/or other situations where security of computing devices is relatively low or unknown, the modification of BIOS settings may be undesirable. However, while conventional computing devices are configurable with a BIOS password that prevents the unauthorized modification of BIOS settings of the BIOS during an initialization process for the computing device, such BIOS passwords do not prevent the modification of BIOS setting of the BIOS (or the instruction of such modifications on a subsequent boot) during a runtime of the computing device (i.e., when the operating system is primarily in control of the computing device).

Accordingly, it would be desirable to provide a BIOS setting runtime modification authentication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: generate a secret; create, with a Trusted Platform Module (TPM) device that is coupled to the processing system using the secret, challenge information that is configured to allow the TPM device to retrieve the secret from the challenge information in response to the receiving a platform owner authentication value; provide, via a user interface subsystem that is coupled to the processing system during runtime operations for the IHS, the challenge information; receive, via the user interface subsystem, a BIOS authentication request; receive, via a user interface subsystem during the runtime operations for the IHS, the secret; and modify, during the runtime operations for the IHS in response to receiving the BIOS authentication request and the secret, at least one of the plurality of BIOS settings.

BRIEF DESCRIPTION OF THE DRAWINGS

FIG. 10 is a schematic view illustrating an embodiment of the operation of the computing device of FIG. 2 during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
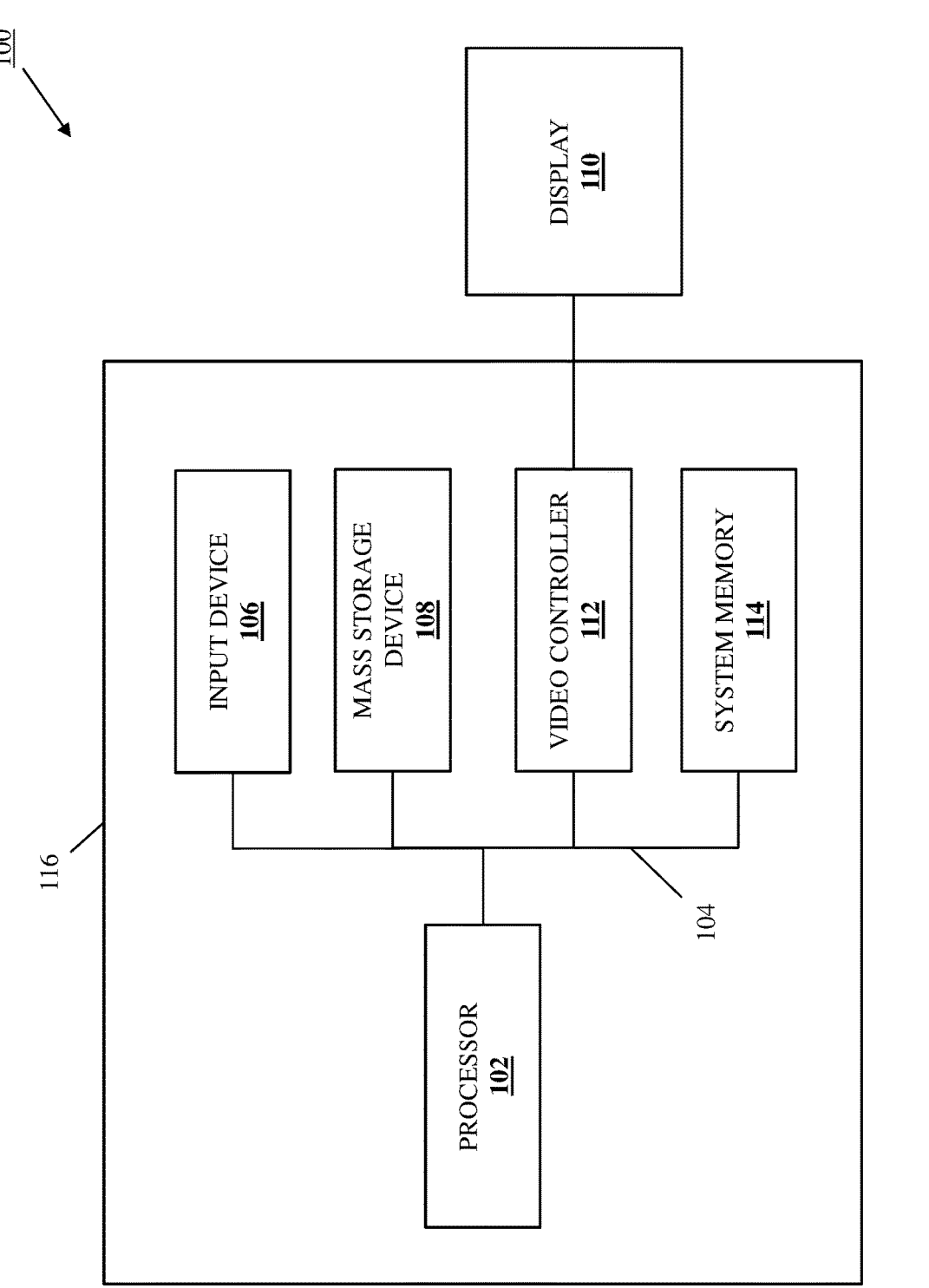
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
FIG. 2 is a schematic view illustrating an embodiment of a computing device that may provide the BIOS setting runtime modification authentication system of the present disclosure.

Referring now to FIG. 2, an embodiment of a computing device 200 is illustrated that may provide the BIOS settings runtime modification authentication system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device discussed below.

In the illustrated embodiment, the computing device 200 includes a chassis 202 that houses the components of the computing device 200, only some of which are illustrated and described below. For example, the chassis 202 may house a BIOS subsystem 204 that is configured to perform hardware initialization during an initialization process for the computing device 200, runtime services for an operating system and/or application/programs provided by the computing device 200, and/or other BIOS operations that would be apparent to one of skill in the art in possession of the present disclosure. Furthermore, while illustrated and described as a "BIOS" subsystem, one of skill in the art in possession of the present disclosure will appreciate how the BIOS subsystem 204 may be provided by a Unified Extensible Firmware Interface (UEFI) subsystem according to the UEFI specification that defines an architecture of platform firmware used to initialize (e.g., boot) hardware in the computing device 200, as well as its interface for interaction with an operating system in the computing device 200, while remaining within the scope of the present disclosure as well.

The BIOS subsystem 204 may include BIOS processing system (not illustrated, but which may be similar to the processor 102 discussed above with reference to FIG. 1 and may be provided by any of a variety of BIOS firmware processing systems that would be apparent to one of skill in the art in possession of the present disclosure) and a BIOS memory system (not illustrated, but which may be similar to the memory 114 discussed above with reference to FIG. 1 and may be provided by any of a variety of BIOS firmware memory systems that would be apparent to one of skill in the art in possession of the present disclosure) that is coupled to the BIOS processing system and that includes instructions that, when executed by the BIOS processing system, cause the BIOS processing system to provide a BIOS engine 204a that is configured to perform the functionality of the BIOS engines and/or BIOS subsystems discussed below. The BIOS subsystem 204 may also include a BIOS storage system (not illustrated, but which may be provided by a BIOS Serial Peripheral Interface (SPI) storage device and/or other BIOS storage devices known in the art) that includes a BIOS database 204b is configured to store any of the information utilized by the BIOS engine 204a as described below.

The chassis 202 may also house a Trusted Platform Module (TPM) device 206 that is coupled to the BIOS subsystem 204 and that one of skill in the art in possession of the present disclosure will recognize may be provided according to the TPM standard for a secure crypto processor that provides a dedicated microcontroller configured to secure hardware in computing devices via integrated cryptographic keys, as well as perform any other TPM functionality that would be apparent to one of skill in the art in possession of the present disclosure. The TPM device 206 may include a TPM processing system (not illustrated, but which may be similar to the processor 102 discussed above with reference to FIG. 1) and a TPM memory system (not illustrated, but which may be similar to the memory 114 discussed above with reference to FIG. 1) that is coupled to the TPM processing system and that includes instructions that, when executed by the TPM processing system, cause the TPM processing system to provide a TPM engine 206a that is configured to perform the functionality of the TPM engines, TPM subsystems, and/or TPM devices discussed below. The TPM device 206 may also include a TPM storage device (not illustrated, but which may be provided by any of a variety of TPM storage components that would be apparent to one of skill in the art in possession of the present disclosure) that is coupled to the TPM engine 206a (e.g., via a coupling between the TPM storage device and the TPM processing system) and that includes a TPM database 206b that is configured to store any of the information utilized by the TPM engine 206*a* described below.

The chassis 202 may also house a user interface subsystem 208 that is coupled to the BIOS subsystem 204 and the TPM device 206. In some examples, the user interface subsystem 208 may include a display device, input device(s) (e.g., a keyboard, mouse, etc.), and/or any other user interface devices that one of skill in the art in possession of the present disclosure will appreciate may be included on desktop computing devices, laptop/notebook computing devices, and/or other computing devices known in the art. In other examples, the user interface subsystem 208 may include a communication system (e.g., Network Interface Controller (NIC) device) that is coupled directly or via a network (e.g., a Local Area Network (LAN), the Internet, combinations thereof, and/or other networks known in the art) to a management device that one of skill in the art in possession of the present disclosure will appreciate may be provided for use with server devices and/or other computing devices known in the art. However, while a few specific examples of user interface subsystems have been described, one of skill in the art in possession of the present disclosure will appreciate how a user may interface with the BIOS settings runtime modification authentication system of the present disclosure in a variety of manners that will fall within the scope of the present disclosure as well.

Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS settings runtime modification authentication functionality discussed below, while remaining within the scope of the present disclosure as well.

Figure 3:
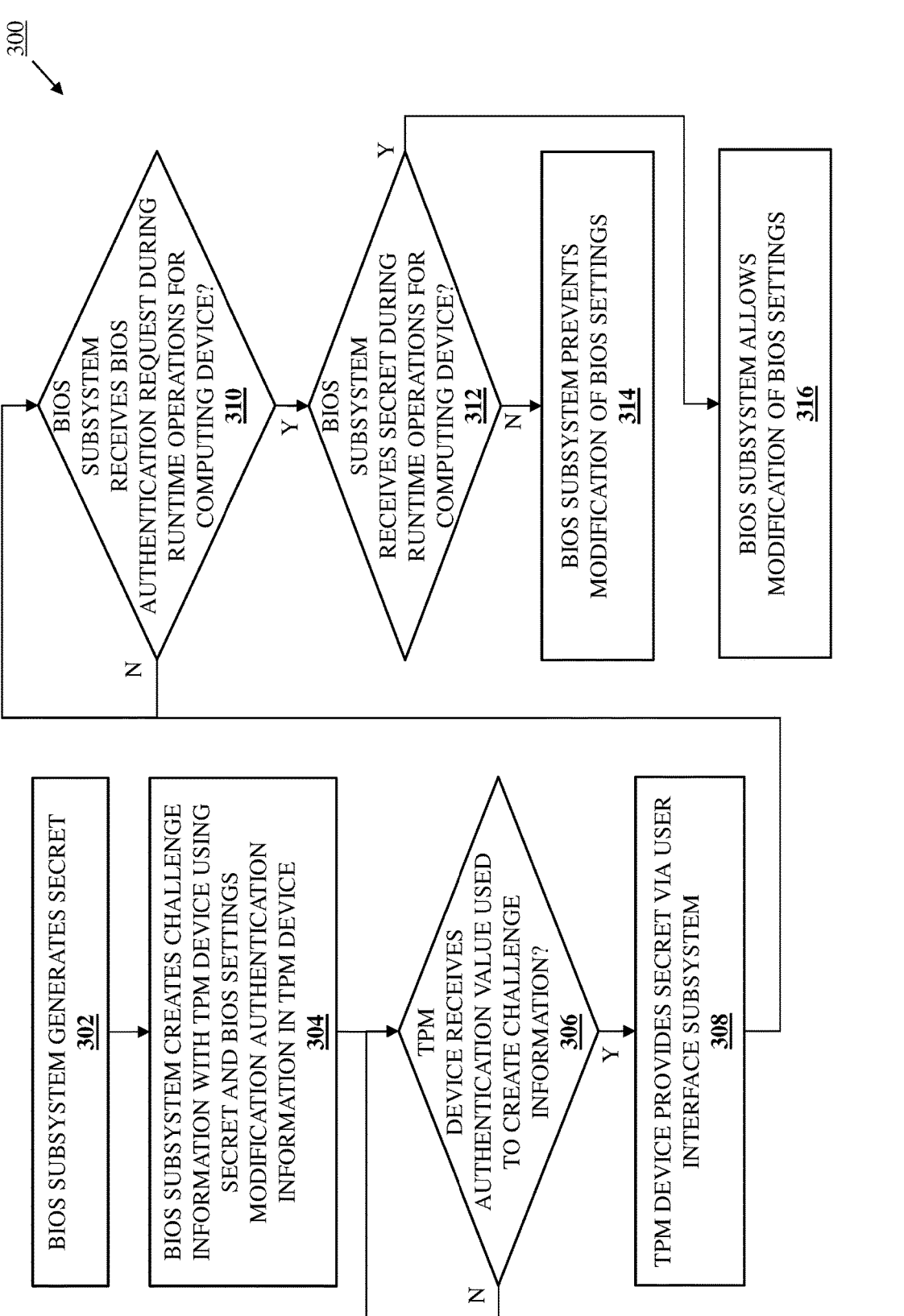
FIG. 3 is a flow chart illustrating an embodiment of a method for authenticating the modification of BIOS settings during runtime of a computing device.

Referring now to FIG. 3, an embodiment of a method 300 for authenticating the modification of Basic Input/Output System (BIOS) settings during runtime of a computing device is illustrated. As discussed below, the systems and methods of the present disclosure provide for the authentication of any BIOS settings modification requested during runtime of a computing device by verifying that BIOS settings modification is being requested by a "platform owner" of that computing device. For example, the BIOS settings runtime modification authentication system of the present disclosure may include a computing device having a user interface subsystem, a TPM device storing a platform owner authentication value, and a BIOS subsystem including BIOS settings. The BIOS subsystem generates a secret and creates challenge information with the TPM device using the secret. The challenge information is configured to allow the TPM device to retrieve the secret from the challenge information in response to the receiving the platform owner authentication value. During runtime operations for the computing device, the BIOS subsystem provides the challenge information via the user interface subsystem, receives a BIOS authentication request and the secret via the user interface subsystem and, in response, modifies at least one of the BIOS settings. As such, BIOS settings modifications may be prevented by any user of a computing device that is not a "platform owner" of that computing device that previously configured that platform ownership via a TPM device in that computing device.

As will be appreciated by one of skill in the art in possession of the present disclosure, embodiments of the present disclosure define a "platform owner" of a computing device that is separate from a user (e.g., a "system administrator") of that computing device that may have access to a BIOS of that computing device. As described above, the "platform owner" of a computing device may provide that computing device (or access to that computing device) to the user of the computing device in an "as-a-Service" (aaS) environment in which the computing device is "rented" or otherwise provided/made available for use by the user, or may provide the computing device in edge computing environments and/or other situations where security of computing devices is relatively low or unknown, either of which present the issues of unauthorized modification of BIOS settings in the computing device. As such, the systems and methods of the present disclosure allow the "platform owner" of the computing device 200 to configure the computing device 200 to perform the BIOS setting runtime modification authentication operations described below prior to the performance of the method 300.

Figure 4:
FIG. 4 is a schematic view illustrating an embodiment of the operation of the computing device of FIG. 2 during the method of FIG. 3.

For example, with reference to FIG. 4, the "platform owner" of the computing device 200 may utilize the user interface subsystem 208 to perform BIOS setting runtime modification authentication configuration operations 400 that include providing BIOS settings modification authentication information in the TPM database 206*b*. For example, BIOS setting runtime modification authentication configuration operations 400 performed via the user interface subsystem 208 may include communicating with the TPM engine 206*a* to enable TPM 2.0 operations by the TPM engine 206*a*, and providing the BIOS settings modification authentication information to the TPM engine 206*a* by setting a platform owner authorization value (e.g., a passcode) for an owner/storage hierarchy that is available via TPM 2.0 operations by the TPM engine 206*a*, which one of skill in the art in possession of the present disclosure will appreciate will cause the TPM engine 206*a* to securely store the platform owner authorization value in the TPM database 206*b*.

Furthermore, one of skill in the art in possession of the present disclosure will also appreciate how the BIOS setting runtime modification authentication configuration operations 400 performed via the user interface subsystem 208 may also include communicating with the TPM engine 206*a* to utilize a seed for the owner/storage hierarchy discussed above to generate a BIOS settings runtime modification authorization key (e.g., a public/private key pair), which one of skill in the art in possession of the present disclosure will appreciate will cause the TPM engine 206*a* to securely store the BIOS settings runtime modification authorization key in the TPM database 206*b*. Further still, one of skill in the art in possession of the present disclosure will also appreciate how the BIOS setting runtime modification authentication configuration operations 400 performed via the user interface subsystem 208 may also include communicating with the TPM engine 206*a* to define a platform owner policy that requires provisioning of the platform owner authorization value discussed above in order to access the BIOS settings runtime modification authorization key discussed above, which one of skill in the art in possession of the present disclosure will appreciate will cause the TPM engine 206*a* to securely store the platform owner policy in the TPM database 206*b*.

As such, during or prior to the method 300, the TPM database 206*b* may securely store BIOS settings modification authentication information that includes a platform owner authorization value, a BIOS settings runtime modification authorization key, and a platform owner policy that requires provisioning of the platform owner authorization value in order to access the BIOS settings runtime modification authorization key. However, while specific BIOS settings modification authentication information used to configure the computing device 200 to perform the BIOS setting runtime modification authentication operations of the present disclosure has been described, one of skill in the art in possession of the present disclosure will appreciate how other BIOS settings modification authentication information may be used to configure the computing device 200 to perform the BIOS setting runtime modification authentication operations of the present disclosure while remaining within the scope of the present disclosure as well.

Figure 5:
FIG. 5 is a schematic view illustrating an embodiment of the operation of the computing device of FIG. 2 during the method of FIG. 3.

The method 300 begins at block 302 where a BIOS subsystem generates a secret. In an embodiment, at block 302, the computing device 200 may be powered on, reset, rebooted, and/or otherwise initialized such that the BIOS engine 204a in the BIOS subsystem 204 begins an initialization process (e.g., a boot process) for the computing device 200. With reference to FIG. 5A, in an embodiment of block 302 and during the initialization process for the computing device 200, the BIOS engine 204a may perform BIOS settings runtime modification authentication identification operations 500 that include identifying that the TPM device 206 has been configured to perform the BIOS settings runtime modification authentication operations of the present disclosure by, for example, identifying that the BIOS settings runtime modification authorization key has been generated and stored in the TPM device 206 by the "platform owner" of the computing device 200 as described above. However, while a specific example has been described, one of skill in the art in possession of the present disclosure will appreciate how the BIOS subsystem 204 may determine that the TPM device 206 is configured to perform the BIOS settings runtime modification authentication operations of the present disclosure using any of a variety of technique while remaining within the scope of the present disclosure as well.

At block 302 and in response to identifying that the TPM device 206 has been configured to perform the BIOS settings runtime modification authentication operations of the present disclosure, the BIOS engine 204a in the BIOS subsystem 204 may perform secret generation operations that may include generating a random nonce or other secret that would be apparent to one of skill in the art in possession of the present disclosure (e.g., during a System Management Mode (SMM) of the computing device 200 that occurs during the initialization process) using any of a variety of random nonce generation techniques and/or other secret generation techniques that would be apparent to one of skill in the art in possession of the present disclosure.

Figure 6:
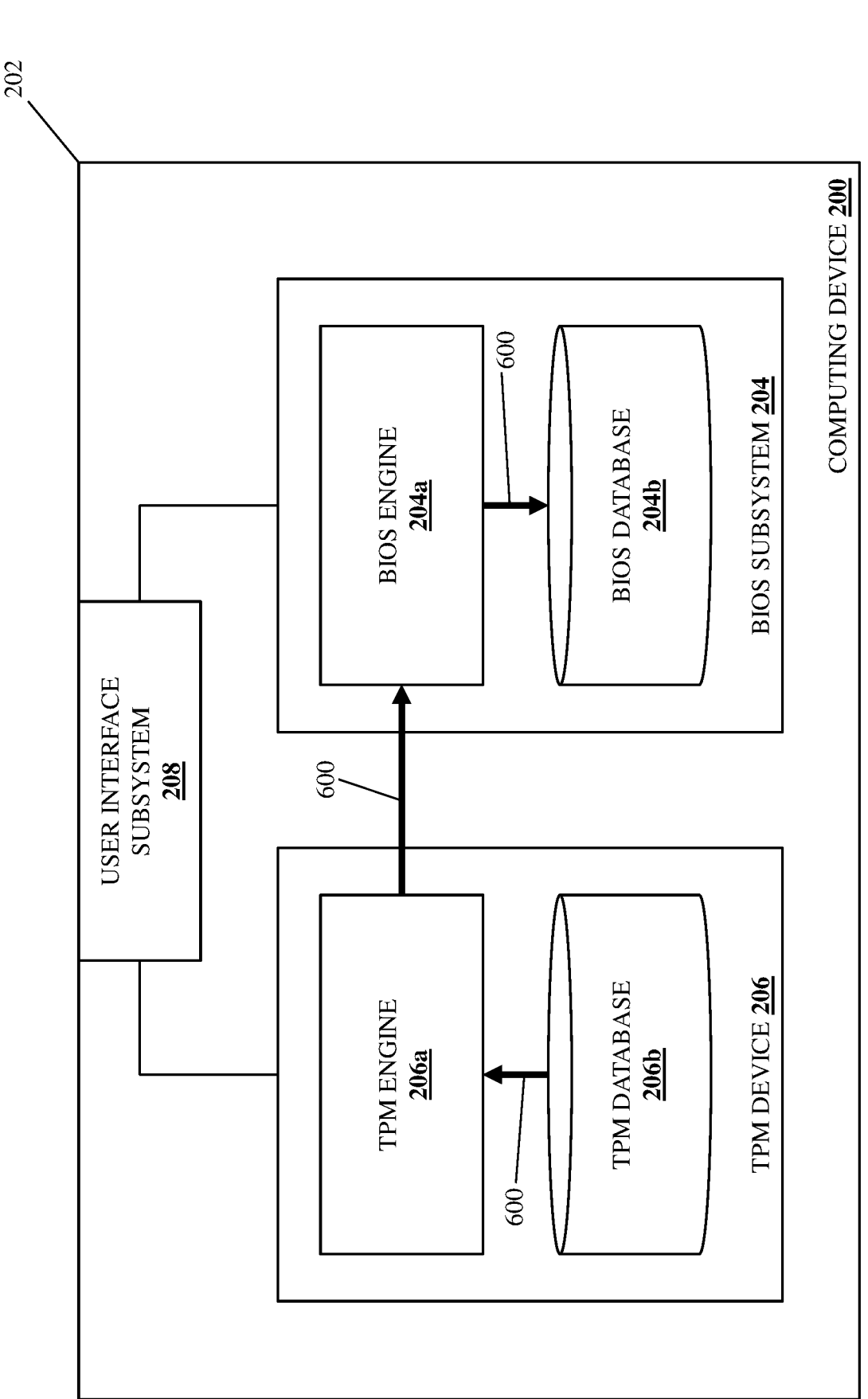
FIG. 6 is a schematic view illustrating an embodiment of the operation of the computing device of FIG. 2 during the method of FIG. 3.

The method 300 then proceeds to block 304 where the BIOS subsystem creates challenge information with a TPM device using the secret and BIOS settings modification authentication information in the TPM device. With reference to FIG. 6, in an embodiment of block 304, the BIOS engine 204a in the BIOS subsystem 204 and the TPM engine 206a in the TPM device 206 may perform challenge information creation operations 600 that include creating challenge information using the BIOS settings modification authentication information stored in the TPM database 206b, the secret generated by the BIOS engine 204a, and/or any other information that would be apparent to one of skill in the art in possession of the present disclosure.

For example, at block 304, the BIOS engine 204a may operate with the TPM engine 206a to utilize the BIOS settings modification authentication information and the secret discussed above with a TPM 2.0 credential creation function (e.g., "TPM2_MakeCredential") in order to generate a credential challenge "blob" that provides (or may provide) the challenge information. To provide a specific example, during Power-On Start-Up (POST) operations during the initialization process for the computing device 200, the BIOS engine 204a may communicate with the TPM engine 206a to utilize a public portion of the BIOS settings runtime modification authorization key with the random nonce or other secret generated at block 302 to create the credential challenge blob at block 304 that may include the random nonce or other secret encrypted using that public portion of the BIOS settings runtime modification authorization key. However, while a specific example of the creation of challenge information has been described, one of skill in the art in possession of the present disclosure will appreciate how challenge information may be created using a variety of techniques that will fall within the scope of the present disclosure as well.

Furthermore, the challenge information creation operations 600 may also include storing the challenge information in the BIOS database 204b. For example, at block 304, the BIOS engine 204a may store the credential challenge "blob" in the BIOS database 204b as a UEFI variable that is configured as read-only (e.g., that has its BIOS attributes and runtime attributes configured as read-only), which one of skill in the art in possession of the present disclosure will appreciate allows the credential challenge blob to be presented via the user interface subsystem 208 as a UEFI variable (e.g., during runtime of the computing device 200). However, while a specific example of the storage of challenge information has been described, one of skill in the art in possession of the present disclosure will appreciate how challenge information may be stored using a variety of techniques that will fall within the scope of the present disclosure as well.

Furthermore, while blocks 302 and 304 are illustrated and described herein as being performed to create the challenge information prior to any request to authenticate to a BIOS provided by the BIOS subsystem 204 and/or to modify settings of a BIOS provided by the BIOS subsystem 204, as discussed below other embodiments of the present disclosure may provide for the performance of blocks 302 and 304 to create the challenge information "on-the-fly" and in response to any request to authenticate to a BIOS provided by the BIOS subsystem 204 and/or to modify settings of a BIOS provided by the BIOS subsystem 204 while remaining within the scope of the present disclosure as well.

Figure 7A:
FIG. 7A is a schematic view illustrating an embodiment of the operation of the computing device of FIG. 2 during the method of FIG. 3.

The method 300 then proceeds to decision block 306 where the method 300 proceeds depending on whether the TPM device receives an authentication value that was used to create the challenge information. As will be appreciated by one of skill in the art in possession of the present disclosure, in order to modify BIOS settings in the BIOS database 204b of the BIOS subsystem 204 during runtime of the computing device 200, a user must first retrieve the secret that was used to create the challenge information at block 304. As such, with reference to FIG. 7A, a user wishing to modify BIOS settings in the BIOS database 204b of the BIOS subsystem 204 during runtime of the computing device 200 may use the user interface subsystem 208 to perform challenge information retrieval operations 700 with the BIOS engine 204a in the BIOS subsystem 204 that may include retrieving, via the BIOS engine 204a, the challenge information that is stored in the BIOS database 204b and that is presented to the user interface subsystem as a read-only UEFI variable as described above. As such, one of skill in the art in possession of the present disclosure will appreciate how the user interface subsystem 208 may be utilized to retrieve the read-only UEFI variable challenge information via the BIOS subsystem 204 using any of a variety of UEFI variable retrieval techniques known in the art.

Figure 7B:
FIG. 7B is a schematic view illustrating an embodiment of the operation of the computing device of FIG. 2 during the method of FIG. 3.

Furthermore, with reference to FIG. 7B, the user may use the user interface subsystem 208 to perform authentication operations 702 with the TPM engine 206a in the TPM device 206 that may include attempting to authenticate to the TPM device 206 by providing an authentication value to the TPM engine 206a in order to retrieve the secret. For example, the user may utilize the user interface subsystem 208 to access a management interface (e.g., a command prompt, a management terminal, etc.), and may use a utility (e.g., a TPM2Tools utility) to generate a TPM authentication command (e.g., a TPM 2.0 credential activation function "TPM2_ActivateCredential") that includes the challenge information, an authentication value (e.g., the platform owner authentication value discussed above if the user is the platform owner), and/or any other TPM authentication information that one of skill in the art in possession of the present disclosure would recognize as providing for the TPM device authentication functionality described below. As such, at decision block 306, the TPM engine 206a may determine whether the authentication value provided as part of the authentication operations 700 includes the platform owner authentication value that was used to create the challenge information.

If, at decision block 306, the TPM engine 206a determines that the authentication value provided as part of the authentication operations 700 does not include the platform owner authentication value that was used to create the challenge information, the method 300 returns to decision block 306. As discussed above, the platform owner policy stored in the TPM database 206b requires a user to present the platform owner authorization value stored in the TPM database 206b in order to access the BIOS settings runtime modification authorization key stored in the TPM database 206b, and thus the TPM engine 206a will not access the BIOS settings runtime modification authorization key stored in the TPM database 206b (which one of skill in the art in possession of the present disclosure will recognize is required to access the secret in the challenge information included in the TPM authentication command) if the authorization value provided by the user does not match the platform owner authorization value that is stored in the TPM database 206b. As such, the method 300 may loop until the TPM engine 206a receives the platform owner authentication value that was used to create the challenge information (e.g., as part of a user authentication to the TPM device 206).

If, at decision block 306, the TPM engine 206a determines that the authentication value provided as part of the authentication operations 700 includes the platform owner authentication value that was used to create the challenge information, the method 300 proceeds to block 308 where the TPM device provides the secret via the user interface subsystem. In an embodiment of decision block 306 and as discussed above, the authentication operations 700 discussed above with reference to FIG. 7 may include the user of the computing device 200 providing the platform owner authorization value (e.g., the passcode) and the challenge information as part of the TPM 2.0 credential activation function (e.g., "TPM2_ActivateCredential"). As such, one of skill in the art in possession of the present disclosure will appreciate how, as part of the TPM 2.0 credential activation function, the TPM engine 206a may determine whether that authorization value matches the platform owner authorization value that is stored in the TPM database 206b.

Figure 8:
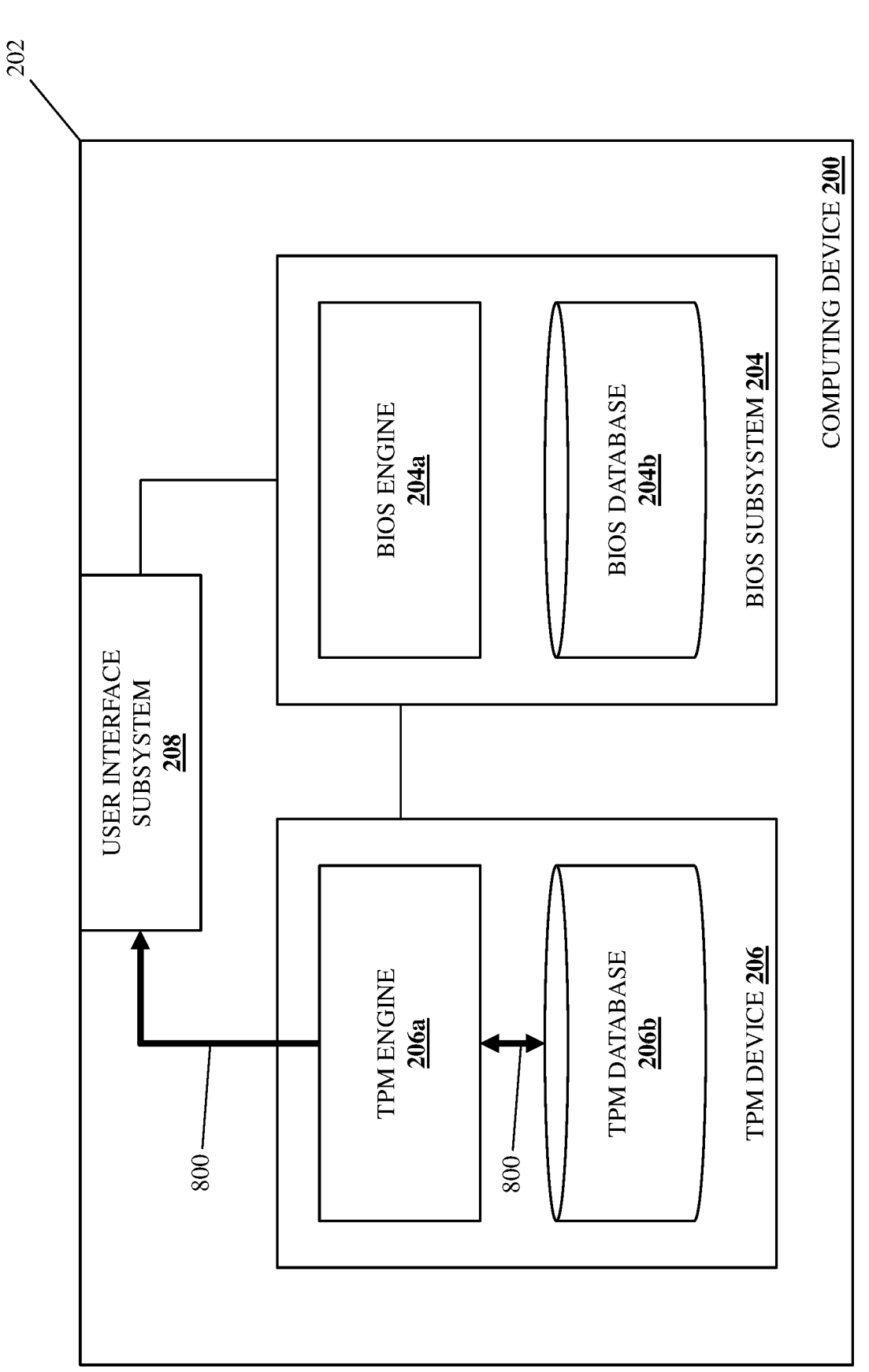
FIG. 8 is a schematic view illustrating an embodiment of the operation of the computing device of FIG. 2 during the method of FIG. 3.

With reference to FIG. 8, if the authorization value provided by the user matches the platform owner authorization value that is stored in the TPM database 206b (e.g., the TPM 2.0 credential activation function executes successfully) at decision block 306, at block 308 the TPM engine 206a may perform secret provisioning operations 800 that include accessing the BIOS settings runtime modification authorization key stored in the TPM database 206b, using a private portion of that BIOS settings runtime modification authorization key to access the secret that is included in the challenge information (e.g., to decrypt the encrypted random nonce or other secret that may be included in the credential challenge blob), and providing that secret to the user interface subsystem 208. However, while a specific example of accessing and providing the secret to the user has been provided, one of skill in the art in possession of the present disclosure will appreciate how the secret may be accessed and provisioned in a variety of manners that will fall within the scope of the present disclosure as well. Furthermore, while the secret is described as being retrieved prior to the creation and provisioning of a BIOS authentication request, as discussed below the secret may be retrieved subsequent to the creation and provisioning of a BIOS authentication request while remaining within the scope of the present disclosure as well.

The method 300 then proceeds to decision block 310 where the method 300 proceeds depending on whether the BIOS subsystem receives a BIOS authentication request during runtime operations for a computing device. In an embodiment, at decision block 310, following the initialization process for the computing device 200 discussed above, the computing device 200 may enter a runtime state (e.g., in which the computing device 200 is controlled by an operating system provided by the computing device 200) and perform runtime operations. At decision block 310 and during those runtime operations, the BIOS engine 204a in the BIOS subsystem 204 may monitor for a BIOS authentication request via the user interface subsystem 208. If, at decision block 310, a BIOS authentication request is not received, the method 300 returns to decision block 310. As such, the method 300 may loop such that the BIOS engine 204a continues to monitor for a BIOS authentication request via the user interface subsystem 208 until a BIOS authentication request is received. If, at decision block 310, a BIOS authentication request is received, the method 300 proceeds to decision block 312 where the method 300 proceeds depending on whether the BIOS subsystem receives the secret during the runtime operations for the computing device. As such, at decision block 312 and during the runtime operations for the computing device 200, the BIOS engine 204a in the BIOS subsystem 204 may monitor for the secret via the user interface subsystem 208.

Figure 9:
FIG. 9 is a schematic view illustrating an embodiment of the operation of the computing device of FIG. 2 during the method of FIG. 3.

With reference to FIG. 9, in an embodiment of decision block 310, the BIOS engine 204a in the BIOS subsystem 204 may perform BIOS authentication request receiving operations 700 that include receiving a BIOS authentication request via the user interface subsystem 208. For example, during the runtime operations by the computing device 200, a user of the computing device 200 may request authentication with a BIOS provided by the BIOS engine 204a by generating a BIOS setting modification request to modify a BIOS setting in the computing device 200 via, for example, the generation of a secure UEFI variable setting command to set a secure UEFI variable that is configured to provide for the modification of that BIOS setting, and the provisioning of the secret that was retrieved at block 308 in that secure UEFI variable setting command (e.g., assuming that the user is the platform owner and was above to retrieve the secret as described above).

In another example, during the runtime operations by the computing device 200, a user of the computing device 200 may request authentication with a BIOS provided by the BIOS engine 204*a* by generating a BIOS authentication request via, for example, the generation of a secure UEFI variable setting command to set a secure UEFI variable that is configured to activate a secure BIOS mode in which at least some BIOS settings may be modified, and provisioning of the secret that was retrieved at block 308 in that secure UEFI variable setting command (e.g., assuming that the user is the platform owner and was above to retrieve the secret as described above).

To provide a specific example of such a secure BIOS mode, during runtime of the computing device 200 a user may request that the BIOS enter the secure BIOS mode on a subsequent boot in order to deploy BIOS configurations/configuration changes that would otherwise require a user to be physically present at the computing device 200 during that subsequent boot (e.g., to be physically present in order to press a physical key during POST in order to identify and deploy those BIOS configurations/configuration changes). However, while a few specific examples of BIOS authentication requests that involve the setting of a secure UEFI variable have been described, one of skill in the art in possession of the present disclosure will appreciate how authentication with the BIOS may be requested in a variety of manners that will fall within the scope of the present disclosure as well.

In a specific example, at decision block 310 and/or decision block 312, the user may use the user interface subsystem 208 to generate a Hash-based Message Authentication Code (HMAC) using the secret (e.g., the random nonce discussed above) retrieved at block 304, and user may then transmit that HMAC along with the BIOS setting modification request or the BIOS authentication request discussed above to the BIOS engine 204*a*. To provide a specific example, the user may use the secret to calculate an HMAC for the BIOS setting being modified, and that HMAC may be transmitted along with that modified BIOS setting in the BIOS setting modification request to the BIOS engine 204*a*.

As will be appreciated by one of skill in the art in possession of the present disclosure, the HMAC generated using the secret as discussed above may be configured to provide for the verification of both the integrity of the BIOS setting modification request or the BIOS authentication request it is transmitted with, as well as the authenticity of the message used to transmit that BIOS setting modification request or the BIOS authentication request. For example, at decision block 312 and as will be appreciated by one of skill in the art in possession of the present disclosure, the BIOS engine 204*a* may access the random nonce it generated at block 302, and may use that random nonce to verify the HMAC and modified BIOS setting received at block 310. However, while a specific example of the validation of a BIOS authentication request has been described, one of skill in the art in possession of the present disclosure will appreciate how BIOS authentication requests may be validated in a variety of manners that will fall within the scope of the present disclosure as well.

As discussed above, while blocks 302 and 304 are illustrated and described above as being performed to create the challenge information prior to receiving the BIOS authentication request, some embodiments of the present disclosure may provide for the performance of blocks 302 and 304 to create the challenge information "on-the-fly" and in response to receiving the BIOS authentication request at decision block 310. For example, the public portion of the BIOS settings runtime modification authorization key stored in the TPM database 206*b* as discussed above may be accessible to the BIOS engine 204*a*, and in response to receiving the BIOS authentication request at decision block 310, the BIOS engine 204*a* may generate the random nonce or other secret, and then operate with the TPM engine 206*a* to utilize the BIOS settings modification authentication information and the secret to create the challenge information (e.g., the credential challenge blog including the encrypted random nonce or other secret described above) similarly as described above, and then present that challenge information via the user interface subsystem 208 (e.g., as a read-only UEFI variable as described above). One of skill in the art in possession of the present disclosure will appreciate how decision block 306 and block 308 may then be performed so that the user may retrieve the secret similarly as described above, and then provide that secret to the BIOS subsystem 204 at decision block 312 following the provisioning of the BIOS authentication request at decision block 310.

If, at decision block 312, the secret is not received during runtime operations for the computing device, the method 300 then proceeds to block 314 where the BIOS subsystem prevents modification of BIOS settings. In an embodiment, at block 314 and in response to receiving the BIOS authentication request at block 310 but not receiving the secret at decision block 312, the BIOS engine 204*a* in the BIOS subsystem 204 will ignore the BIOS setting modification request received via the user interface subsystem 208, ignore the BIOS authentication request received via the user interface subsystem 208, and/or otherwise prevent any modification to any BIOS settings associated with the BIOS subsystem 204.

If, at decision block 312, the secret is received during runtime operations for the computing device, the method 300 then proceeds to block 316 where the BIOS subsystem allows modification of BIOS settings. With reference to FIG. 10, in an embodiment of block 316 and in response to receiving the BIOS authentication request at block 310 and receiving the secret at decision block 312, the BIOS engine 204*a* in the BIOS subsystem 204 may perform BIOS setting modification operations 1002 that may include executing the BIOS setting modification request received via the user interface subsystem 208 to modify one or more BIOS settings that are associated with the BIOS subsystem 204 (and that are stored in the BIOS database 204*b* in FIG. 10B), executing the BIOS authentication request received via the user interface subsystem 208 to cause the BIOS subsystem 204 to enter a secure BIOS mode that allows for the modification of one or more BIOS settings that are associated with the BIOS subsystem 204 (and that are stored in the BIOS database 204*b* in FIG. 10B), and/or otherwise allow modification to one or more BIOS settings associated with the BIOS subsystem 204.

Thus, systems and methods have been described that provide for the authentication of any BIOS settings modification requested during runtime of a computing device by verifying that BIOS settings modification was requested by an "platform owner" of that computing device. For example, the BIOS settings runtime modification authentication system of the present disclosure may include a computing device having a user interface subsystem, a TPM device storing a platform owner authentication value, and a BIOS subsystem including BIOS settings. The BIOS subsystem generates a secret and creates challenge information with the TPM device using the secret. The challenge information is configured to allow the TPM device to retrieve the secret from the challenge information in response to the receiving the platform owner authentication value. During runtime operations for the computing device, the BIOS subsystem provides the challenge information via the user interface subsystem, receives a BIOS authentication request and the secret via the user interface subsystem and, in response, modifies at least one of the BIOS settings.

As such, BIOS settings modifications may be prevented by any user (e.g., a system administrator) of a computing device that is not a "platform owner" of that computing device that has configured that platform ownership via a TPM device in that computing device, and one of skill in the art in possession of the present disclosure will appreciate how the teachings of the present disclosure may be used to authenticate boot path changes, lock any of a variety of BIOS settings or configurations in a manner that requires authentication to unlock, configure any of a variety of BIOS operations as "allowed" or "disallowed" for unauthenticated users, and/or provide other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) settings runtime modification authentication system, comprising:
   a computing device;
   a user interface subsystem that is included in the computing device;
   a Trusted Platform Module (TPM) device that is included in the computing device, that is coupled to the user interface subsystem, and that stores a platform owner authentication value; and
   a BIOS subsystem that is included in the computing device, that is coupled to the user interface subsystem and the TPM device, that includes a plurality of BIOS settings, and that is configured to:
      generate a secret;
      create, with the TPM device using the secret, challenge information, wherein the TPM device is configured to retrieve the secret from the challenge information in response to the receiving the platform owner authentication value;
      provide, via the user interface subsystem during runtime operations for the computing device, the challenge information;
      receive, via the user interface subsystem during runtime operations for the computing device, a BIOS authentication request;
      receive, via the user interface subsystem during the runtime operations for the computing device and subsequent to providing the challenge information, the secret; and
      modify, during the runtime operations for the computing device in response to receiving the BIOS authentication request and the secret, at least one of the plurality of BIOS settings.

2. The system of claim 1, wherein the generating the secret and the creating the challenge information is performed during an initialization process for the computing device that occurs prior to the runtime operations for the computing device, and wherein the BIOS subsystem is configured to:
   receive the secret with the BIOS authentication request.

3. The system of claim 1, wherein the generating the secret and the creating the challenge information is performed during the runtime operations for the computing device and in response to receiving the BIOS authentication request.

4. The system of claim 1, wherein the platform owner authentication value includes a platform owner passcode, and wherein the TPM device is configured with a policy to use private key that is included in a public/private key pair to retrieve the secret from the challenge information in response to receiving the platform owner passcode.

5. The system of claim 1, wherein the challenge information is presented via the user interface subsystem as a read-only Unified Extensible Firmware Interface (UEFI) variable.

6. The system of claim 1, wherein the BIOS authentication request is received in a Hash-based Message Authentication Code (HMAC) message.

7. An Information Handling System (IHS), comprising:
   a processing system; and
   a memory system that is coupled to the processing system and that includes instructions that, when executed by the processing system, cause the processing system to provide a Basic Input/Output System (BIOS) engine that is configured to:
      generate a secret;
      create, with a Trusted Platform Module (TPM) device that is coupled to the processing system using the secret, challenge information that is configured to allow the TPM device to retrieve the secret from the challenge information in response to the receiving a platform owner authentication value;
      provide, via a user interface subsystem that is coupled to the processing system during runtime operations for the IHS, the challenge information;
      receive, via the user interface subsystem, a BIOS authentication request;
      receive, via a user interface subsystem during the runtime operations for the IHS and subsequent to providing the challenge information, the secret; and
      modify, during the runtime operations for the IHS in response to receiving the BIOS authentication request and the secret, at least one of the plurality of BIOS settings.

8. The IHS of claim 7, wherein the generating the secret and the creating the challenge information is performed during an initialization process for the IHS that occurs prior to the runtime operations for the IHS, and wherein the BIOS engine is configured to:
   receive the secret with the BIOS authentication request.

9. The IHS of claim 7, wherein the generating the secret and the creating the challenge information is performed during the runtime operations for the IHS and in response to receiving the BIOS authentication request.

10. The IHS of claim 7, wherein the platform owner authentication value includes a platform owner passcode, and wherein the TPM device is configured with a policy to use private key that is included in a public/private key pair to retrieve the secret from the challenge information in response to receiving the platform owner passcode.

11. The IHS of claim 7, wherein the challenge information is presented via the user interface subsystem as a read-only Unified Extensible Firmware Interface (UEFI) variable.

12. The IHS of claim 7, wherein the BIOS authentication request is received in a Hash-based Message Authentication Code (HMAC) message.

13. The IHS of claim 7, wherein the BIOS authentication request instructs the modification of the at least one BIOS setting.

14. A method for authenticating the modification of Basic Input/Output System (BIOS) settings during runtime of a computing device, comprising:

generating, by a Basic Input/Output System (BIOS) sub-system, a secret;

creating, by the BIOS subsystem with a Trusted Platform Module (TPM) device using the secret, challenge information that is configured to allow the TPM device to retrieve the secret from the challenge information in response to the receiving the platform owner authenti-cation value;

providing, by the BIOS subsystem via a user interface subsystem during runtime operations for the computing device, the challenge information;

receiving, by the BIOS subsystem via the user interface subsystem during runtime operations for a computing device that includes the BIOS subsystem, a BIOS authentication request;

receiving, by the BIOS subsystem via the user interface subsystem during the runtime operations for the com-puting device and subsequent to providing the chal-lenge information, the secret; and modifying, by the BIOS subsystem during the runtime operations for the computing device in response to receiving the BIOS authentication request and the secret, at least one of the plurality of BIOS settings.

15. The method of claim 14, wherein the generating the secret and the creating the challenge information is per-formed during an initialization process for the IHS that occurs prior to the runtime operations for the IHS, and wherein the method further includes:

receiving, by the BIOS subsystem, the secret with the BIOS authentication request.

16. The method of claim 14, wherein the generating the secret and the creating the challenge information is per-formed during the runtime operations for the IHS and in response to receiving the BIOS authentication request.

17. The method of claim 14, wherein the platform owner authentication value includes a platform owner passcode, and wherein the TPM device is configured with a policy to use private key that is included in a public/private key pair to retrieve the secret from the challenge information in response to receiving the platform owner passcode.

18. The method of claim 14, wherein the challenge information is presented via the user interface subsystem as a read-only Unified Extensible Firmware Interface (UEFI) variable.

19. The method of claim 14, wherein the BIOS authen-tication request is received in a Hash-based Message Authentication Code (HMAC) message.

20. The method of claim 14, wherein the BIOS authen-tication request instructs the modification of the at least one BIOS setting.

* * * * *